No. 816,650. PATENTED APR. 3, 1906.
S. DAVIS.
CUTTING APPARATUS FOR MOWING MACHINES.
APPLICATION FILED DEC. 5, 1905.
2 SHEETS—SHEET 1
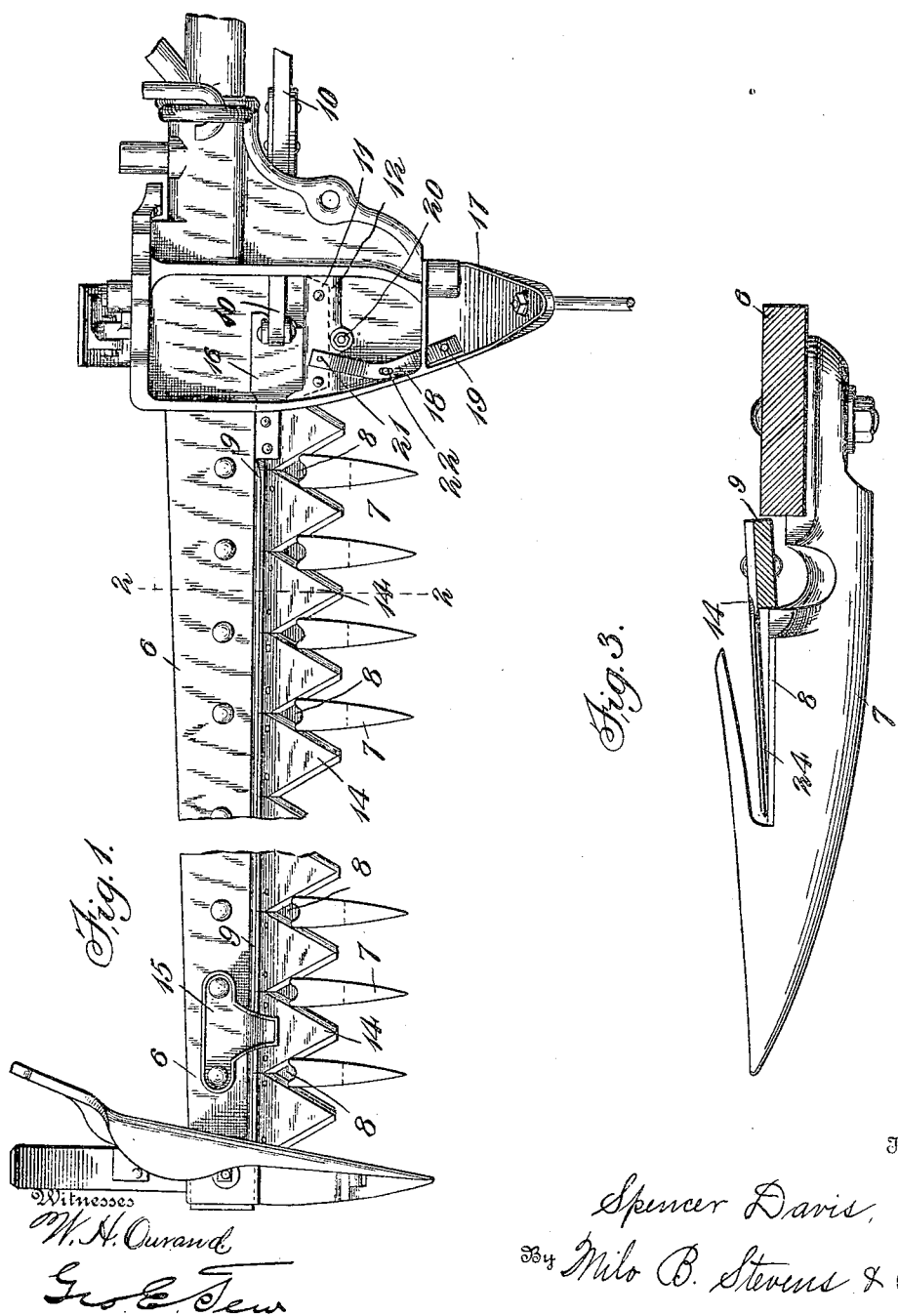
Witnesses
W. H. Ourand
Geo. E. Tew
Inventor
Spencer Davis,
By Milo B. Stevens & Co.
Attorneys No. 816,650. PATENTED APR. 3, 1906.
S. DAVIS.
CUTTING APPARATUS FOR MOWING MACHINES.
APPLICATION FILED DEC. 5, 1905.
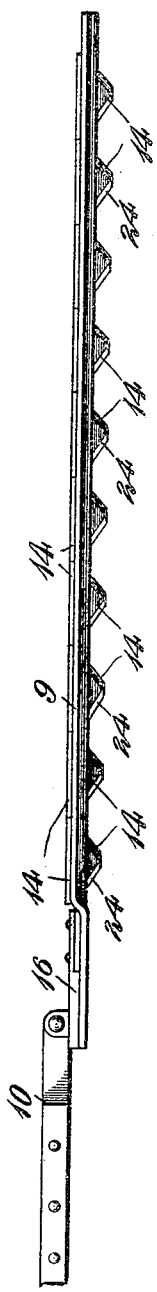
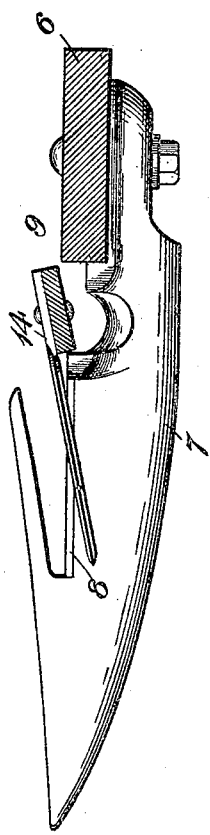

UNITED STATES PATENT OFFICE.

SPENCER DAVIS, OF HAZELTON, KANSAS.

CUTTING APPARATUS FOR MOWING-MACHINES.

No. 816,650.　　　　　Specification of Letters Patent.　　　　　Patented April 3, 1906.

Application filed December 5, 1905. Serial No. 290,378.

*To all whom it may concern:*

Be it known that I, SPENCER DAVIS, a citizen of the United States, residing at Hazelton, in the county of Barber and State of Kansas, have invented new and useful Improvements in Cutting Apparatus for Mowing-Machines, of which the following is a specification.

This invention relates to the cutting apparatus of harvesters—such as mowing-machines, binders, and the like—and particularly to those machines having a reciprocating cutter-bar.

The object of the invention is to produce a shear cut by the blades and also to make them self-sharpening and to confine them closely to the ledger-plates which form the opposite cutting edges.

Attempts have been made to insure a close contact or shear between the cutting edges of blades and the ledger-plates by the use of springs, which bear upon the top of the knives or which, in other words, confine the same closely to the ledger-plates. These are deficient in that when the knives become dull or the parts become worn tough or heavy grass will be caught between the blades and the ledgers by reason of slight lift of the former, and so choke or clog the machine. The springs referred to have no other purpose and effect than to press the knives closely to the ledger-plates. The large under surface of the knives does not wear as quickly as the edges. Consequently the edges can become rounded or dull and the contact referred to will not serve to sharpen them. There are various other objections to the devices referred to incident to additional and complicated parts and the expense thereof.

It is the object of my invention to remedy these defects and to produce a construction in which the cutting edges of the knives will always be presented to the coacting edges of the ledger-plates at the proper angle to insure a shear cut whether the knives are dull or not. The only way the self-sharpening feature can be insured is to present the coacting edges of the knives and ledger-plates to each other at an angle, so that one wears against and sharpens the other. This idea is embodied in my invention and is effected by giving the cutter-bar a slight twist near the heel thereof, whereby when in one position the points of the knives are depressed or thrown down between the fingers, and as the bar is reciprocated one edge of the knives rides up the adjacent edge of the ledger-plates and then the other edge rides down the opposite edge of the ledger-plates. This whets the knives both ways. This produces in practice a bevel on the under side of the knives which is somewhat similar to, although not so great as, the bevel commonly found on the upper side of such knives. The twist in the cutter-bar causes the edges of the knives to be pressed upon the ledger-plates with a spring-pressure due to the operation of the cutter-bar, which effects the sharpening action referred to and also prevents the knives from lifting out of contact with the ledger-plates.

The invention may be applied to any existing machines by simply taking out the cutter-bar and giving it a slight twist near the heel. The effect of this is to depress the points of the knives and to lift the bar partly from the groove in which it ordinarily runs, so that the weight of the bar is supported entirely by the knives on their edges, where they rest upon the ledger-plates, and when the bar is reciprocated the ride of the blades up and down the edges of the ledger-plates gives rise to a characteristic rocking motion of the bar. The holders which are usually employed to press the bar and knives down are either removed or lifted, except, preferably, the one at the toe or outer end of the bar, and it has been found by actual use that the strain is not sufficiently great to either break the knives or the bar and a machine will run much easier than with the old way, since much power is gained owing to the shear cut by two edges which are always in close contact. The heel of the sickle-bar runs in the same guides, as usual, and the bar is operated in the same way, the spring-pressure and inclined position of the knives referred to being produced by the slight twist given the cutter-bar. This twist is sufficient to depress the points of the knives below the edges of the ledger-plates, in practice about one-fourth of an inch, although it may be more or less.

The invention is illustrated in the accompanying drawings, Figure 1 being a top plan view of a cutter-bar and associated parts constructed according to this invention. Fig. 2 is a section on the line 2 2 of Fig. 1. Fig. 3 is a similar section with the cutter-bar at mid-stroke. Fig. 4 is a rear view of the cutter-bar.

Referring specifically to the drawings, 6 indicates the bar to which the guard-fingers 7 are secured in any suitable manner. These fingers have ledger-plates 8, which may be of any desired construction. The cutter-bar 9 is connected to the pitman 10 in any suitable manner, and at its heel it carries the usual blind section or blade 11, which works over the shoe and under the cap-plate 12. At a distance preferably of one knife from the blind section—that is, between the first and second blades—the cutter-bar 9 is twisted slightly, so as to lift the rear edge thereof, as clearly appears in the sectional views and in Fig. 4. This has the effect of tilting downward the knives 14, which are of the usual shape and manner of attachment. The holders, as stated before, are removed, except that one at the outer end may be used, as indicated at 15. The heel of the cutter or sickle bar is held down by the plate 16 usually employed for that purpose. As shown in the sectional views, the twist given the sickle-bar causes it to ride free above the finger-bar, so that its weight rests at the crossed edges of the knives and the ledger-plates. When the cutter-bar is reciprocated, the knife-edges ride up and down the edges of the ledger-plates, and the pressure causes the cutter-bar to give or yield downwardly to allow the motion. The effect of this is to produce a slight bevel on the under side of the knives, as at 24, the degree thereof depending on the angle of downward inclination of the knives. A similar effect is also produced on the ledger-plates, so that a cutting edge is at all times maintained on both of said parts, and this cutting edge never becomes dull, because it is constantly being whetted or sharpened as the machine is used. It has been found by experience that the wear on the knives is not so great as with the ordinary construction, because more is lost in the grinding necessary to sharpen the ordinary knives than in the whetting or sharpening which takes place in the construction herein disclosed.

Existing machines have a plate 12, heretofore referred to, which is bolted to the shoe 17 and rests upon the blind blade or section. To compensate for wear which would or might occur upon this plate, I provide a yielding construction by means of a flat spring 18, which is bolted at one end, as at 19, to the body of the shoe and bears at its rear end upon the top of the plate 12. The fastening-bolt 20 of this plate is left loose, and the spring has a lug 21, which fits in a hole in the top of the plate to hold the parts in place. The spring also has a bolt 22, which is tapped into the shoe and through the spring for the purpose of varying the tension of the spring upon the plate, and consequently upon the blind section of the cutter-bar. On a newly-constructed machine where the heel of the cutter-bar fits closely this spring is inactive; but when the heel becomes worn, as it is bound to do in time in consequence of the backward thrust and pressure, the spring bearing upon the plate will take up any tilt or lost motion which would otherwise occur and hold the heel level. This spring is of considerable stiffness and while not absolutely essential to the use of the invention will be found advantageous in practice. In the form shown it is particularly adapted to the McCormick machine; but on other machines it may be varied according to the construction of the shoe and plate and other local conditions.

With my invention there is a shear cut between the crossed edges at all times. Consequently no gum can collect, or if it does collect it makes no difference, inasmuch as the knives do not slide flatly upon the ledger-plates, but are presented at an angle thereto.

I claim—

1. A cutting apparatus for harvesters and the like, having relatively stationary cutting members and a relatively movable cutter-bar carrying cutting members which coact therewith, and in which the cutter-bar is twisted near the heel thereof, so that the planes of the cutting edges of the respective members cross each other at an angle.

2. The combination in a cutting apparatus, of fingers having ledger-plates, and a reciprocating yielding cutter-bar the points of the blades of which are tilted so that the edges of the blades cross the edges of the ledger-plates at an angle.

3. The combination in a cutting apparatus, of a finger-bar, and a reciprocating cutter-bar the heel of which slides in guides and the body of which is yieldingly supported and carries its knives with their points depressed so that the plane of the knife edges crosses the plane of the coacting edges on the fingers.

4. The combination in a cutting apparatus, of a finger-bar, and a reciprocating cutter-bar the heel of which slides in guides and the body of which is free to yield up and down and has its upper surface inclined downwardly and forwardly and its knives secured thereon with their cutting edges extending at an angle across the coacting edges on the fingers.

5. The combination in a cutting apparatus, of a finger-bar, a yielding reciprocating cutter-bar thereon having knives the plane of whose cutting edges crosses the plane of the coacting edges of the bar, and a spring-pressed plate covering a section at the heel of the cutter-bar.

6. The combination in a cutting apparatus, of a finger-bar and shoe, a yielding reciprocating cutter-bar thereon, a plate covering a section at the heel of the cutter-bar, and a spring secured to the shoe and bearing upon the plate.

In testimony whereof I have signed my name to this specification in the presence of two subscribing witnesses.

SPENCER DAVIS.

Witnesses:
M. R. KUNSMAN,
GEO. E. TEW.